United States Patent
Grothe et al.

(10) Patent No.: US 6,997,594 B2
(45) Date of Patent: Feb. 14, 2006

(54) UNDER VEHICLE INSPECTION SYSTEM

(76) Inventors: William J. Grothe, 28186 Amable, Mission Viejo, CA (US) 92692; Jianli Ren, 51 Timberland, Aliso Viejo, CA (US) 92656; Paul E. Robbins, 28071 Gallina, Mission Viejo, CA (US) 92692; Peter McNicol, 8421 Crane Cir., Huntington Beach, CA (US) 92646

( * ) Notice: Subject to any disclaimer, the term of this patent is extended or adjusted under 35 U.S.C. 154(b) by 0 days.

(21) Appl. No.: 10/414,148

(22) Filed: Apr. 14, 2003

(65) Prior Publication Data

US 2003/0193818 A1 Oct. 16, 2003

Related U.S. Application Data

(60) Provisional application No. 60/373,069, filed on Apr. 15, 2002.

(51) Int. Cl.
*F21W 131/00* (2006.01)

(52) U.S. Cl. .................. 362/576; 362/559; 362/581; 362/253; 362/145; 362/153

(58) Field of Classification Search ............... 362/551, 362/559, 581, 576, 253, 145, 153, 153.1
See application file for complete search history.

(56) References Cited

U.S. PATENT DOCUMENTS

| 4,947,293 | A | * | 8/1990 | Johnson et al. ............. 362/485 |
| 5,678,914 | A | * | 10/1997 | Dealey et al. .............. 362/551 |
| 5,887,856 | A | * | 3/1999 | Everly, II ..................... 256/1 |
| 5,915,830 | A | * | 6/1999 | Dickson et al. ............ 362/495 |
| 6,431,717 | B1 | * | 8/2002 | Anderson et al. ............ 362/31 |

* cited by examiner

*Primary Examiner*—Laura Tso

(57) ABSTRACT

A portable vehicle inspection system including a series of mats into which two lengths of flexible, polymeric side light transmitting optical fiber extend along channels placed near the edges of the mats, and at a distance to be within the tracks of wheels of a vehicle passing thereover, with the polymeric fiber optic including notches and a reflector directed to provide a steady, uniform flood of light up to the underside of a vehicle to be inspected, and between the inspection zone, and the light source, the polymeric optical fiber is covered by an opaque jacket to prevent light from radiating outward.

14 Claims, 7 Drawing Sheets

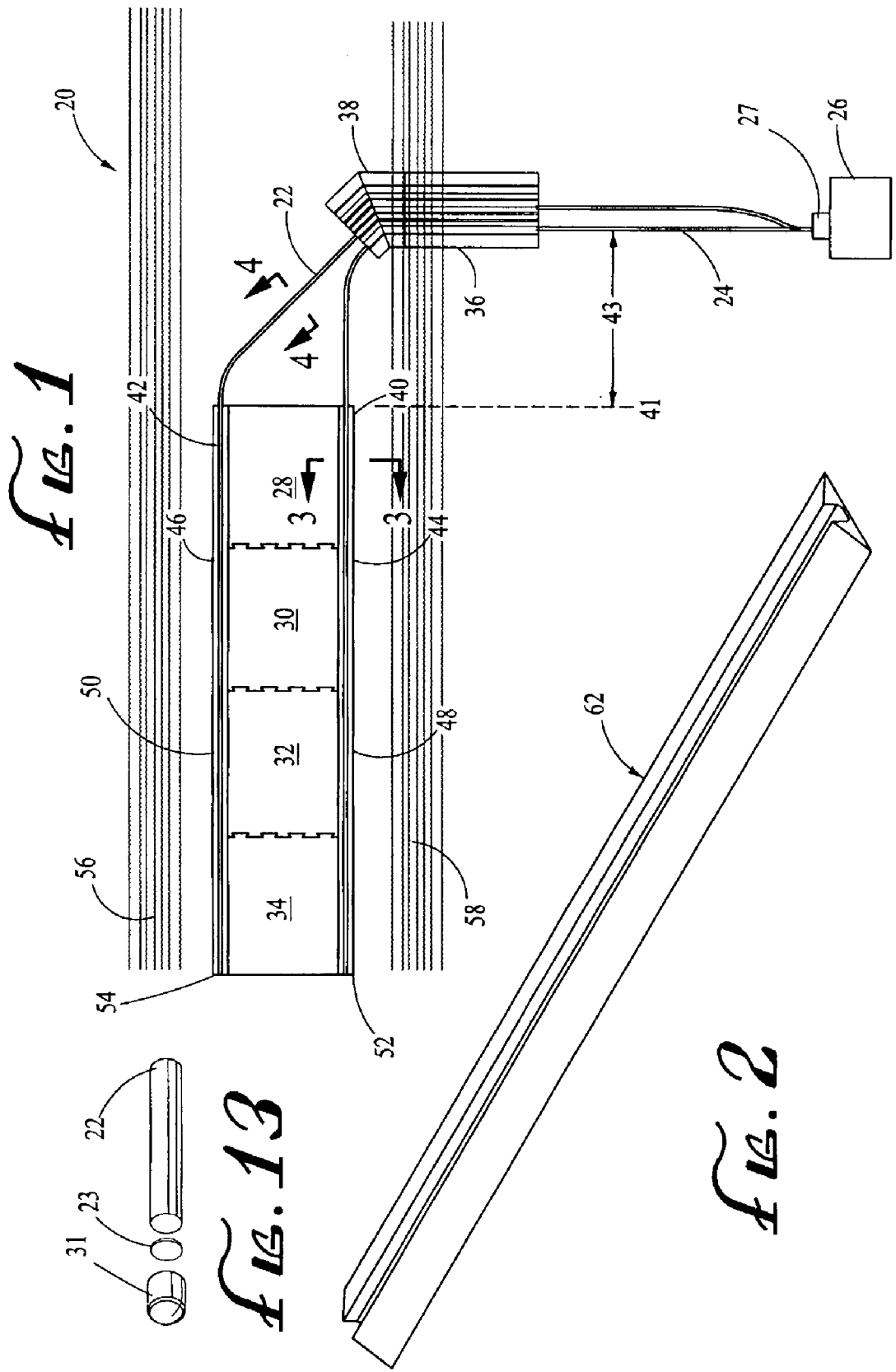

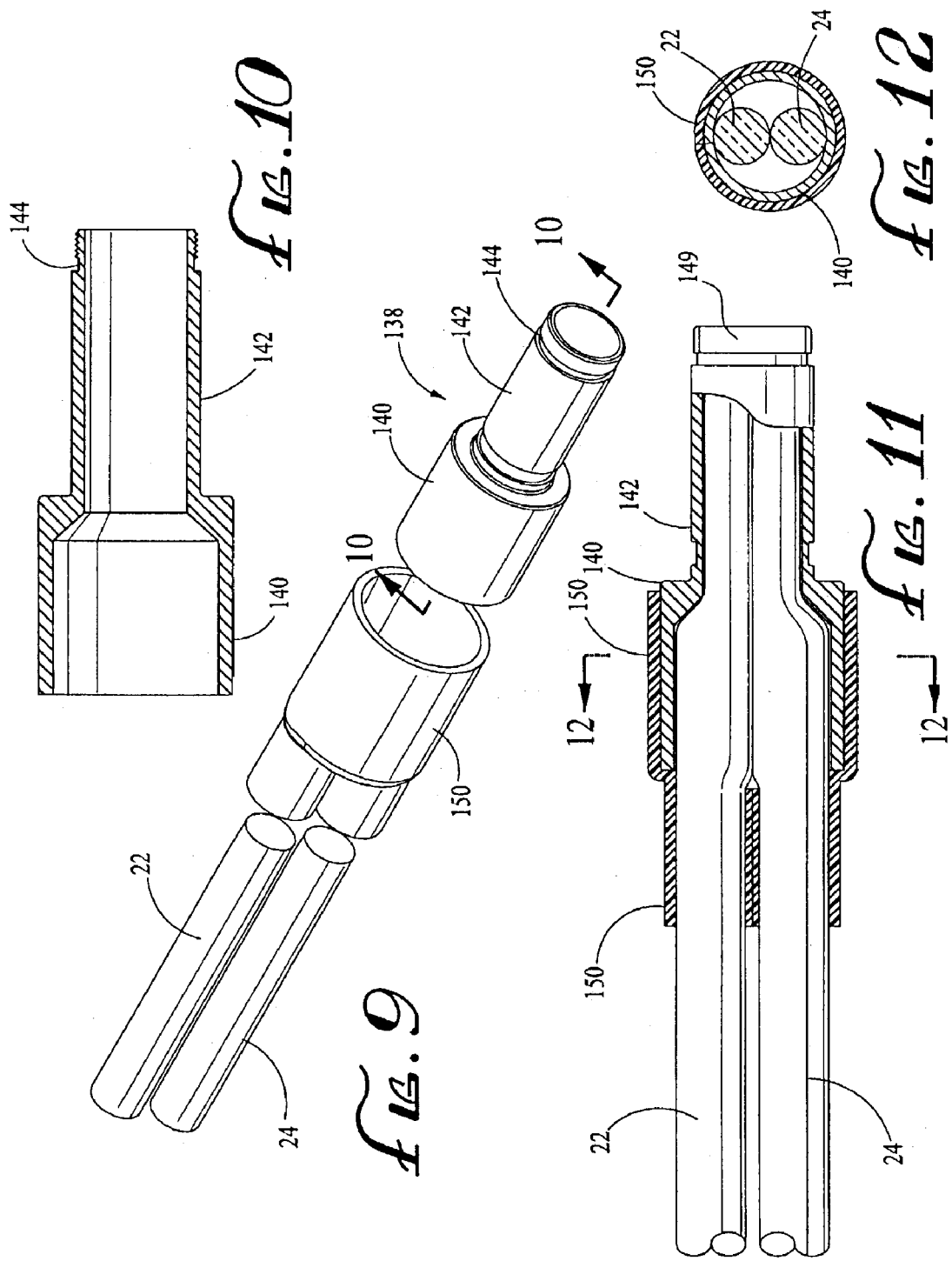

UNDER VEHICLE INSPECTION SYSTEM

CROSS REFERENCE TO RELATED APPLICATIONS

This application claims the benefit of U.S. Provisional Application Ser. No. 60/373,069, filed Apr. 15, 2002, which is incorporated herein by reference.

TECHNICAL FIELD

The present invention is directed to a system that may be used for lighting the underside of vehicles to facilitate inspection thereof.

BACKGROUND ART

In the field of security, and more particularly in regard to inspection of vehicles, especially the undersides of vehicles, it is well known to raise the vehicle up off the ground through use of a ramp, or hydraulic lift, or the like, as well as by inspection through use of a conventional flash light. Also, inspection with the inspector kneeling or crawling underneath the vehicle and inspecting the underside of the vehicle is known. Heretofore it is believed to be unknown to use an inspection system in which a flexible, polymeric fiber optic conduit is positioned underneath the path of a vehicle and is illuminated along its entire length, to direct light upward to illuminate the underside of a vehicle for this purpose.

DISCLOSURE OF INVENTION

In accordance with the principles of the present invention, an inspection system is provided in which flexible, fiber optic conduit is adapted for inspection of areas that are difficult and/or inconvenient to inspect, such as, for example, the underside of vehicles. Lengths of such conduit are attached to mats that are placed to extend along the ground between the paths of wheels of a vehicle to define the inspection area. When the conduit's remote light source is energized, light is transmitted along the length of the fiber optic conduit, and is radiated upward to provide a steady source of light for the underside of the vehicle in the inspection area. Also, the system is portable, with the components adapted to be assembled and disassembled in relative ease, speed and simplicity.

The preferred fiber optic conduit is made of a flexible, organic polymer that receives light from a remote light source, transmits the light along its length to the inspection area, and then radiates the light upward, preferably at about a 60° angle, to the underside of the vehicle to be inspected. Preferably, the fiber optic conduit is provided in two predetermined lengths that are placed in parallel under and along the path of a vehicle and between the wheels of the vehicle whereby the light radiating upwards provides illumination for the entire underside of the vehicle. The two lengths of conduit are also, preferably, placed in tracks or channels that are fastened to mats placed on the ground in the inspection area. At their distal ends remote from the light source, each conduit includes an end cap in which a mirror is positioned to reflect light back into the conduit. Preferably, the two conduits in the tracks are illuminated from a single, remote light source.

The preferred conduit is generally cylindrical in shape and includes a core, a cladding surrounding the core, a reflective layer that extends approximately 300 degrees around the clad core and a transparent or translucent finish jacket that surrounds and encloses the reflector, cladding and core. Preferably, slits are cut in the clad core at various distances along the length of the conduit in the inspection region to increase the light emission radially outward during use. From the light source to the beginning of the inspection area, the optical conduit used in the present invention is, preferably, additionally covered with an opaque material that functions as a cover or additional jacket. From the light source to the beginning of the inspection region the light conduit is further covered with the opaque covering, so that light is prevented from being transmitted radially outward from the conduit. In the inspection region no opaque cover is used; rather the conduit is clad and jacketed with transparent or translucent material so that the light may be transmitted radially outward from the conduit and up into the inspection areas on the underside of the vehicle to be inspected.

Various of the components of the system are also provided with shock, adverse environment and mishandling resistance features, to render the system highly durable for use in a wide variety of conditions of use.

BRIEF DESCRIPTION OF THE DRAWINGS

Detailed drawings of the present invention are shown in the attached Figures, in which:

FIG. 1 is a top, schematic view of a preferred embodiment of the present invention.

FIG. 2 is a side, perspective view of a preferred channel or track for use in the present invention.

FIG. 9 is a partial, exploded view of the conduit of the FIG. 1 embodiment.

FIG. 10 is a longitudinal cross-sectional view of the harness of the FIG. 1 embodiment.

FIG. 11 is a longitudinal partial cross-sectional view of the harness of the FIG. 1 embodiment, as assembled.

FIG. 12 is a transverse cross-sectional view of the assembly of FIG. 11 taken through 12—12.

FIG. 13 is an exploded view of the distal end of one of the conduits of the FIG. 1 embodiment.

BEST MODE FOR CARRYING OUT THE INVENTION

Figure 3:
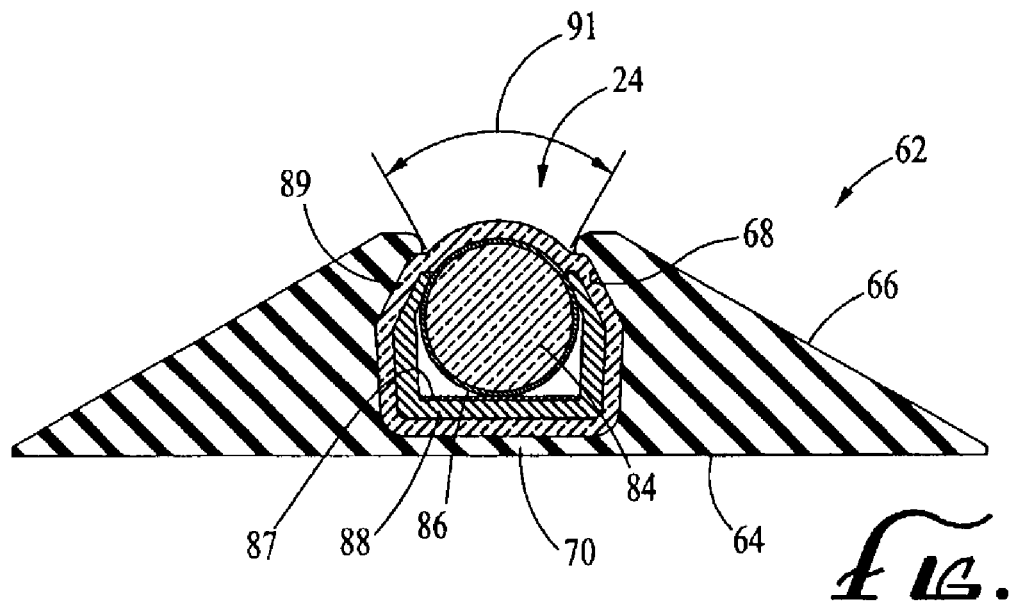
FIG. 3 is a cross-sectional view taken along line 3—3 of FIG. 1.

With reference to FIGS. 1–13, preferred embodiments of the present invention will be described. A preferred embodiment 20 of the under vehicle inspection system includes a first polymeric optical conduit 22 and a second polymeric optical conduit 24 connected to a light source 26 via a harness 27. Both conduits extend from the light source to an inspection region that is generally defined as a region underneath the path of a vehicle, extending from front to back of the vehicle and between its tires on either side. Preferably, the optical conduits 22 and 24 are placed in tracks or channels attached to a plurality of substrate units or mats 28, 30, 32 and 34 as shown in FIG. 1. The conduits 22 and 24 are shown placed in a predetermined configuration through use of protective overdrive units 36 and 38, having channels or tracks, shown between the light source 26 and the inspection area. The conduits 22 and 24 are also positioned in inspection area tracks or channels 40, 42, 44, 46, 48, 50, 52 and 54. The substrate units or mats 28, 30, 32 and 34 are positioned linearly adjacent to each other and, preferably in a vehicle path, with the path of the vehicle defined, for example, by tire tracks 56 and 58. Preferably, the optical conduits 22 and 24 in the inspection area are arrayed in a predetermined substantially planar configuration. The number of mats, the shape of the mats, the planar configuration of the individual fiber optic conduits in the inspection area, the number and length of the individual fiber optic conduits in the inspection area, the total length of the fiber optic conduit, the diameter of the fiber optic conduits and the specifications of the light source may be varied in accordance with known principles, and be within the spirit and principles of the present invention.

In the preferred embodiment of the system, as configured and shown in FIG. 1, a distance of approximately 83 inches is preferred from the output of the light source 26 to the beginning of the bend of conduit 22 nearest the beginning of the inspection area, and, with a bend radius of approximately 49.8 inches. Typically the optical conduit 24 preferably extends a distance of approximately 61 inches from the connection of the conduit to the light source 26 to the beginning of the bend nearest the beginning of the inspection area, and with a preferred bend radius of approximately 39.8 inches. From the end of the bend of the conduit 22 to the beginning of the inspection region, the preferred distance is approximately 24.5 inches. The corresponding length for the conduit 24 is approximately 29.5 inches. A typical horizontal distance 43 from the conduits 22, 24 where they emerge from harness 27 to the extension 41 of the beginning edge of track 40 is approximately 70 inches. The light source 26 is typically placed to one side of the vehicle path and is typically oriented so that the conduits 22, 24 emerge from the light source generally perpendicular to the vehicle path.

The preferred substrate units or mats are interlocking floor mats manufactured by Protech Mats Industry as its Black SBR (recycled tire rubber granules) and colored EPDM (ethlyne-propylene-diene-methylene) mats.

Preferably, the length of conduits 22 and 24 from the light source to the beginning of the inspection area, are surrounded with an opaque, heat shrinkable covering. The most preferred covering is a polyolefin material that is white, black, or otherwise opaque. The light impervious cover or coating in this region assists in the inspection by preventing extraneous light from entering the inspection area. Furthermore, the additional protection afforded by this cover is useful for the reason that it provides an additional source of protection to the conduit in this area of the system that is driven over and stepped on during normal use.

Figure 4:
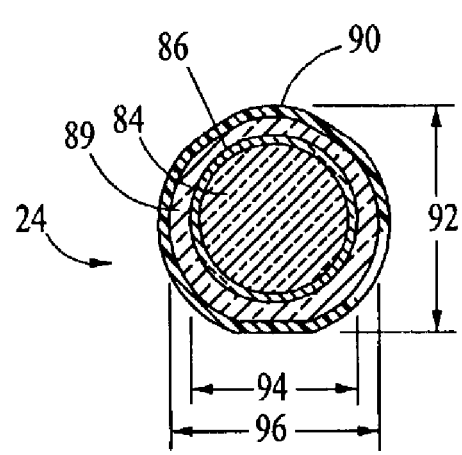
FIG. 4 is a cross-sectional view of the FIG. 1 embodiment taken along line 4—4.

A typical section of the channel or track 62 is illustrated in FIG. 2. The channel 62 is manufactured by Kirkhill Rubber Company, and is a black ethyleneproylene-diene-methylene (EPDM) material. Other materials may be used, so long as the finished track provides durability and can be shaped as illustrated, to retain or hold lengths of the optical fiber, as illustrated in FIGS. 1, 3–4. Referring to FIG. 3, a cross-section of the conduit 24, as placed in the track 62 is shown. The track 62 includes a bottom edge 64, two inclined top surfaces, one of which is shown as 66 and bottom central region 70. The track 62 has an open channel 68 extending throughout its length, and into which the fiber optic 24 is placed.

The fiber optic used in the present invention is, preferably, manufactured by Lumenyte International Corporation as its STA-FLEX® brand fiber optic, LEF linear emitting optical fiber. This fiber optic conduit includes core 84, cladding 86, adhesive transfer tape or other suitable adhesive 87, reflector 88 and jacket 89. The jacket is preferably translucent or transparent. The reflector is preferably a white, reflective material that partially surrounds the periphery of the clad core in an arc of approximately 300 degrees, to provide a light transmitting, or emission arc 91 of about 60 degrees. The reflector is positioned so that the emission arc 91 faces upward toward the underside of the vehicle during use.

As shown in FIG. 4, in the region that is covered with the opaque heat shrink covering, the conduit 24 does not include the reflector 88. Here the conduit 24 includes core 84, cladding 86, jacket 89 and the opaque covering 90. The covering 90 is preferably a heat shrinkable tube of polyolefin material that has been placed over the predetermined length of conduit and then shrunk to form a tight, durable and light impervious coating. The total diameter 92 of the conduit 24 in this region, top to bottom is typically about 0.76 inches. The diameter 94 of the clad core is typically about 0.54 inches and the horizontal diameter 96 is typically about 0.76 inches. Alternatively, the conduits may include the reflector 88 in this region, if desired. The fiber optic conduit preferably has a round, or circular cross-section, although different cross-sectional shapes of conduit may be used.

Further referring to FIGS. 2–3, the preferred width of the track 62 is approximately 3.38 inches, with the preferred width of the channel 68 being approximately 0.75 inches and the preferred height of the channel 68 being approximately 0.75 inches.

Figure 5:
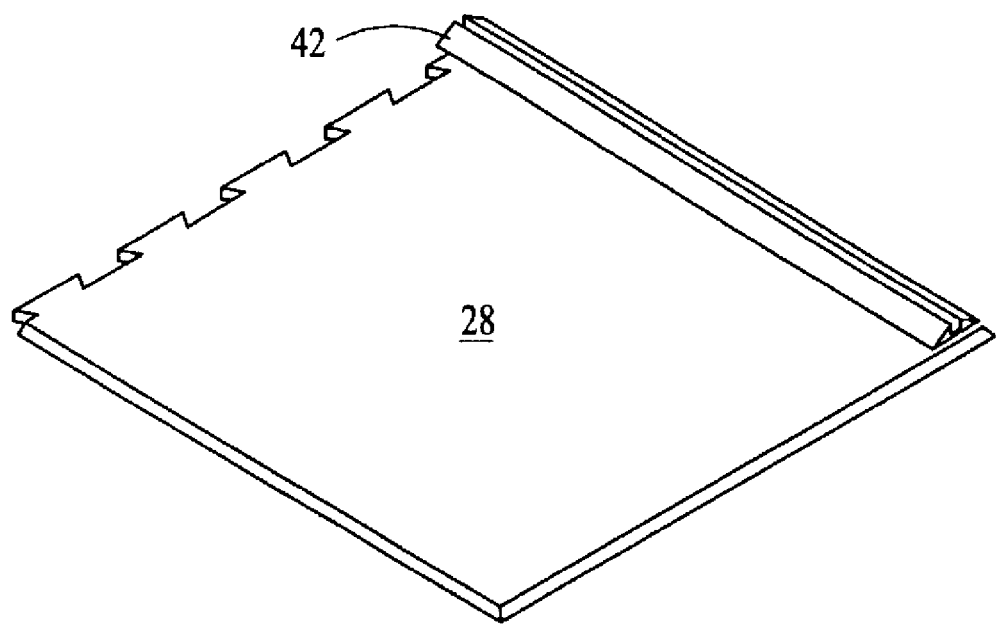
FIG. 5 is a partial, perspective view of the FIG. 2 embodiment mounted to a mat.

Referring to FIG. 5, a perspective view of a track 62 is shown, in which the track section 62 has been adhered to mat section 28 using an adhesive such as cyanoacrylate or other high bonding strength adhesive.

Referring to FIG. 4, a cross-section of the optical conduit, taken along line 5—5 illustrates the core 84, surrounded by a clad 86, in turn surrounded by a clear finish jacket 89, and in turn surrounded by a black or otherwise light impervious jacket 90, having been made by shrinking a heat shrinkable polyolefin tube placed around the outer periphery of a predetermined length of the fiber optic conduit 24.

As shown in FIG. 13, the distal ends of each of the conduits remote from the light source, with only conduit 22 illustrated, are provided with an end cap 31. Also, preferably, a mirror 23 or other reflective material is placed within the end cap and oriented to reflect light back into the conduit. The end cap 31 and mirror 23 or other reflective material are bonded to the fiber end using a suitable, preferably liquid, adhesive.

With respect to FIGS. 6–12 light source 26 and harness 27 sub-assemblies of the present invention will be described. Light source 26 is a conventional standard illuminator available from Lumenyte International Corporation in its catalog number AR15-1234228, modified as described below. In general, the modifications include a special, shock absorption layer bracket with a lamp plate, lamp ring, lamp housing, two silicon rubber rings, two, 3-inch diameter elastomeric bumpers mounted in the bottom, rotated fan and exhaust ports, a screw retainer to the lid screw, a light shut off mechanism or shutter, and a thin screw connection to the harness. The harness is available from Lumenyte International Corporation as its catalog number AR-HARN-M, that has been modified as described below. Light source 26 is also provided with an extra long power cord, such as for example 50 feet or more, to more easily facilitate setting up the system in an outdoors location. The coupling 25 has been fitted with an easy to use thumb screw 96, in order to facilitate the rapid assembly and disassembly.

As shown in FIGS. 1, 6 and 9–12, harness 27 provides for rapid and easy assembly as well as disassembly.

Figure 6:
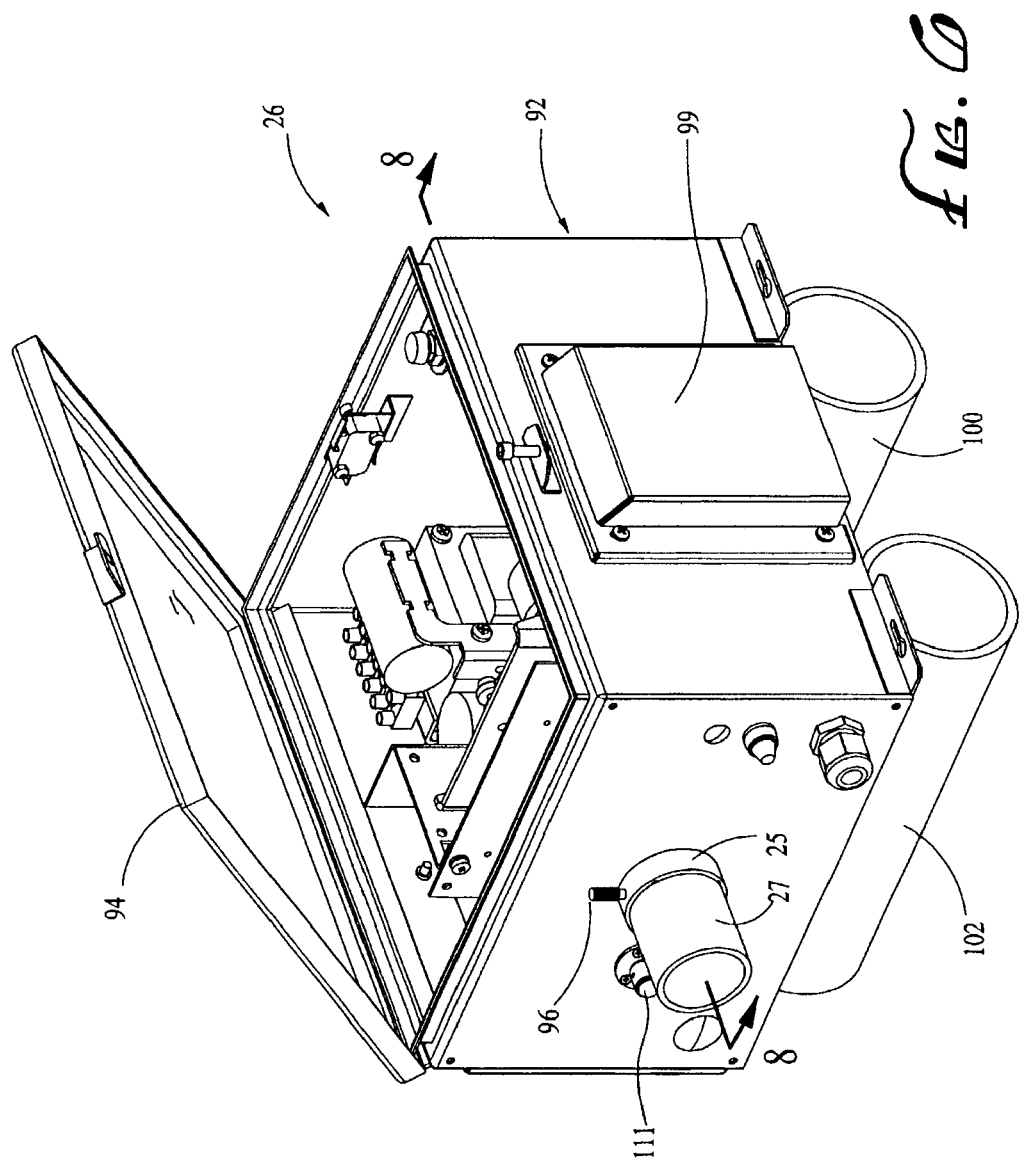
FIG. 6 is a partial, perspective view of the light source of the FIG. 1 embodiment.
Figure 8:
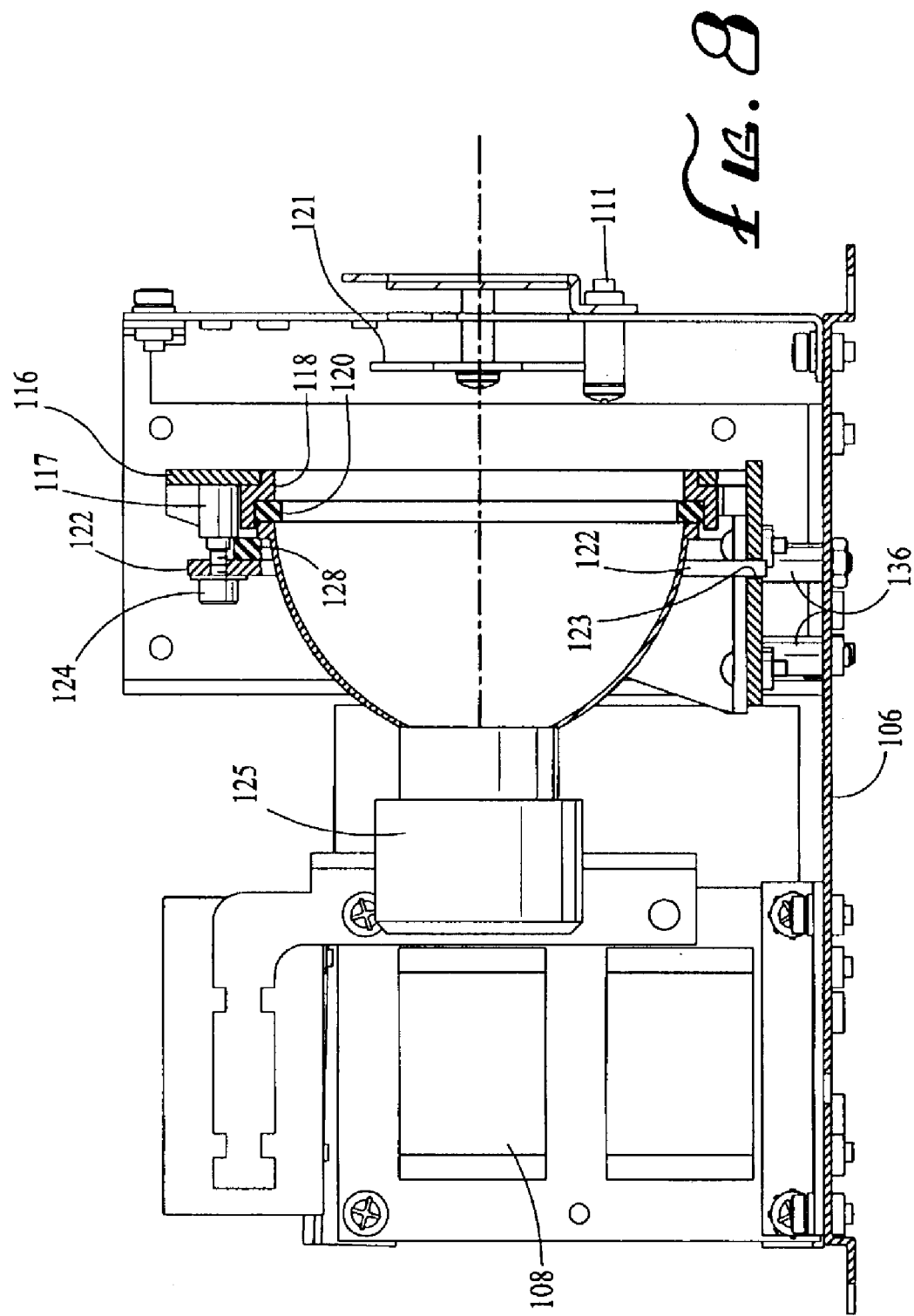
FIG. 8 is a side, perspective view taken along line 8—8 of FIG. 6.

Referring to FIGS. 6 and 8, a preferred embodiment light source 26 includes a coupling 25, a housing 92 with a hinged top 94 with a lid screw and a screw retainer. Fan and exhaust ports cover plate 99 is provided with the opening facing downward. Elastomeric tubes and bumper 100 and 102 are fastened to the bottom of the housing 92, with conventional screws, or other conventional fasteners. The bumper 100, 102 are preferably 3-inches in diameter and are sufficiently durable and rigid to maintain their shape and condition during use. The bumper 100, 102 are made of flexible PVC, so as to be flexible enough to provide a shock absorbing function if the light source dropped. The coupling 25 is provided with a thumb screw 96 for rapid assembly and disassembly, without the need for special tools.

Figure 7:
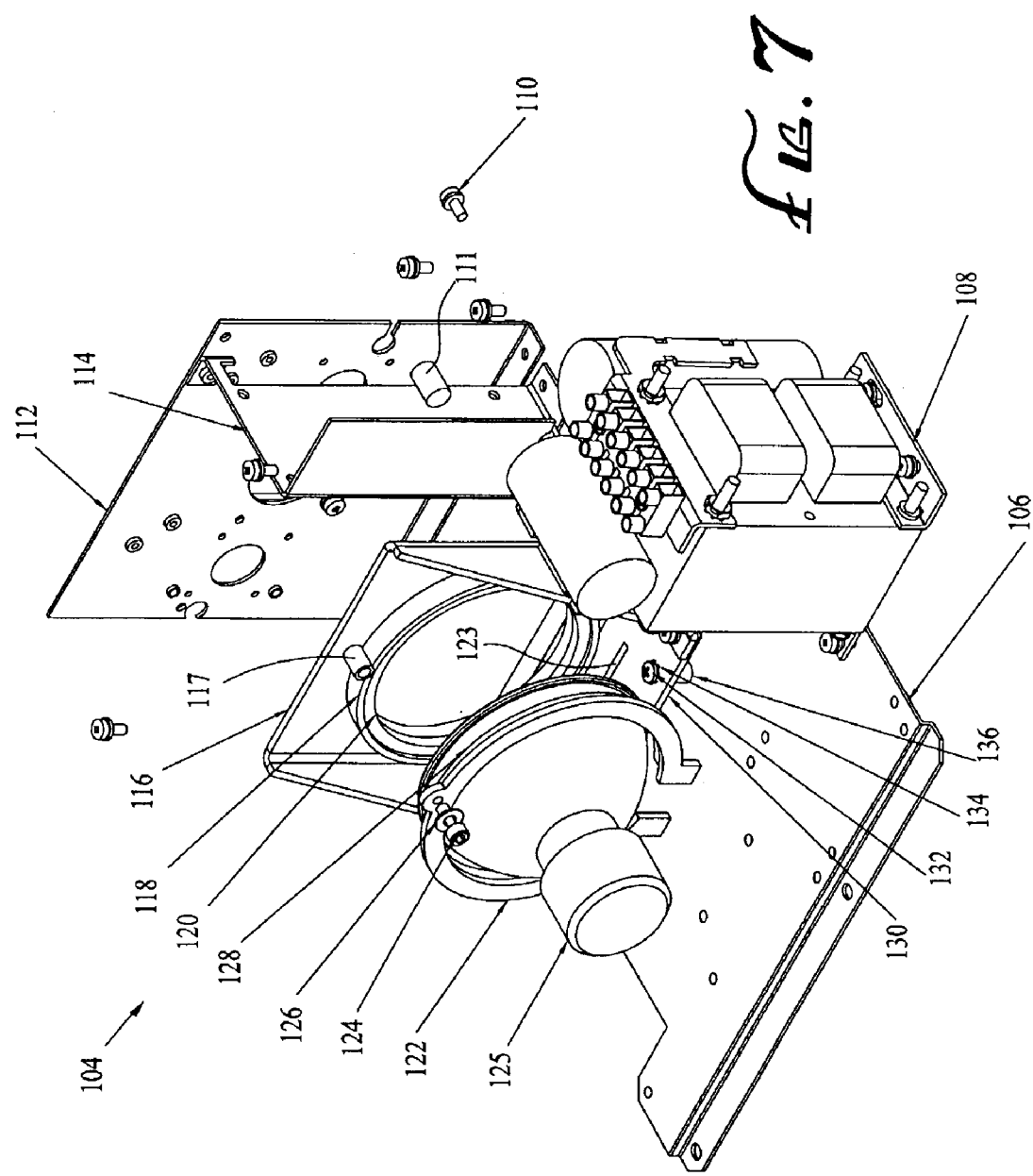
FIG. 7 is a partial, exploded view of the interior of the light source of the FIG. 1 embodiment.

Referring to FIGS. 6–8, the internal light assembly 104 includes a base plate 106 and a power supply 108. The various components are, preferably fastened together through use of conventional hardware such as fasteners 110. The assembly 104 also includes a front plate 112, side plate 114, and light shut off mechanism or shutter 121 having control mechanism 111 as shown.

Aluminum lamp bracket 116 includes two side walls and a front wall having an aperture through which the light beam passes. Also included in the bracket 116 is a threaded socket 117. Aluminum lamp retaining ring 118 includes a larger diameter portion adjacent a smaller diameter portion to provide a shoulder against which gaskets 120 rests. Preferably the gasket material is made of a silicon rubber to provide shock resistance as well as durability functions in a variety of environmental conditions. Lamp mounting ring 122 is preferably made of aluminum, and includes an upper ear having an aperture through which the retaining screw 124 is inserted for securing the lamp 125 to the assembly. The bottom portion of the mounting ring 122 is open ended, with legs extending therefrom and adapted to be inserted into a retaining slot 123 in lamp bracket plate 130, in a conventional fashion. Washer 126 is also shown positioned between the head of the screw 124 and the ear-aperture of the mounting ring 122. A second silicon rubber gasket 128 is shown positioned against and adjacent to the mounting ring 122. Gasket 128 has a gap to conform to the lower gap of the ring 122. Lamp bracket plate 130 is shown fixed to the base plate 106 through use of screws 132, washers 134 and spacers 136, all of which are conventional. The plate 130 is provided with a slot 123 into which the two legs of the mounting ring 122 are removably positioned.

Referring to FIGS. 9–11, harness 27 includes a ferrule 138. Ferrule 138 has a larger diameter downsteam end 140 and relatively narrow upstream end 142, having a threaded portion 144 adapted to receive threaded cap 149. Cap 149 is removed when the inspection system is assembled for use, and is replaced when the ferrule 138 is disconnected from the light source 26. Cap 149 protects the conduits 22, 24 and seals the interior of ferrule 138 against entry of foreign matter. matter. The ferrule 138 is preferably made of aluminum, and functions to protect the upstream end of the fiber optic conduit and facilitate connection to the light source. As shown in FIGS. 9 and 11–12, the conduit 22, 24 are positioned inside of the ferrule 138. A dual heatshrink boot 150 including a circular tubular collar portion is configured to receive and guide the closely adjacent parallel conduits 22, 24 into its circular tubular collar portion. The dual heatshrink boot 150 fits over and is affixed to the larger diameter end 140 of ferrule 138 to provide a secure connection of the conduits 22, 24 to the harness 27 of light source 26. Optionally the fiber optic conduits 22, 24 may be packed into the larger diameter end 140 of ferrule 138 with a suitable conventional packing material such as an epoxy or hot melt glue.

Various system orientations may be provided, such as for example the one shown in FIG. 1 in which two lengths of fiber optic conduit, for the two sides of the mats is dead-ended at the end of the mats and a single illuminator is used for both conduits. In another alternate system configuration, a double run of fiber optic may be used, with a total of four lengths of conduit. Alternatively, a plurality of fiber optic conduits may be configured in other substantially planar arrays.

While the present invention has been described in connection with what is presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

We claim the following:

1. An optical fiber lighting system comprising:
    at least one predetermined length of fiber optic conduit arrayed in a substantially planar configuration;
    one or more substrate units adapted to be removably linked to other of said substrate units;
    each said substrate unit further adapted to be positioned beneath a wheeled vehicle;
    each said substrate unit further adapted to be removably joined with said fiber optic conduit;
    said fiber optic conduit removably joined with said at least one substrate unit;
    said fiber optic conduit adapted to project transmitted light in a predetermined arc outwardly from said at least one substrate unit;
    said fiber optic conduit optically connected with a light source.

2. The optical fiber lighting system of claim 1 further including:
    a plurality of predetermined lengths of fiber optic conduit arrayed in a substantially planar configuration.

3. A fiber optic conduit under vehicle inspection system comprising:
    a light source adapted to illuminate at least one fiber optic conduit;
    at least one length of flexible polymeric fiber optic conduit operationally connected to said light source;
    said conduit adapted to emit transmitted light radially outwardly in a radial arc subtending a predetermined angle, over a first predetermined light emitting portion of its length;
    said conduit sheathed by an opaque cover over a second predetermined portion of its length;
    a portable track having a linear slot adapted to removably retain the light emitting portion of said conduit;
    said light emitting portion of the conduit disposed in the track whereby the light emitting arc of the conduit is positioned to emit light over said predetermined angle through said slot; and said track adapted to be positioned under a vehicle.

4. The fiber optic conduit under vehicle inspection system of claim 3 wherein:

said light emitting portion of the conduit includes a reflecting layer.

5. A fiber optic conduit under vehicle inspection system comprising:

a light source adapted to illuminate at least one fiber optic conduit;

at least one length of light transmitting fiber optic conduit adapted to be illuminated by said light source connected thereto;

at least one section of track of predetermined length having a longitudinal channel adapted to removably retain said fiber optic conduit;

a first portion of said optical conduit disposed in said longitudinal channel with a predetermined radial arc of said conduit covered by said channel;

said first portion of the optical conduit including a clad polymeric core partially surrounded by a reflective layer extending over a predetermined radial arc of the clad core, sheathed by a surrounding light transmitting polymeric jacket;

said first portion of the optical conduit adapted to emit transmitted light radially outwardly over a predetermined radial arc;

said first portion of the optical conduit oriented within said channel such that the radial arc through which light is emitted and the radial arc covered by the channel do not intersect;

a second portion of the optical conduit including the clad polymeric core sheathed by a polymeric jacket, surrounded by a jacket of opaque material.

6. The fiber optic conduit under vehicle inspection system of claim 5 wherein:

the radial arc of said conduit covered by said channel does not exceed approximately 300°.

7. The fiber optic conduit under vehicle inspection system of claim 5 wherein:

the radial arc of said clad polymeric core surrounded by the reflective layer does not exceed approximately 300°.

8. The fiber optic conduit under vehicle inspection system of claim 5 wherein:

the radial arc through which light is emitted from said first portion of the optical conduit is approximately 60°.

9. The fiber optic conduit under vehicle inspection system of claim 5 wherein:

said second portion of the optical conduit extends between said first portion and said light source.

10. The fiber optic conduit under vehicle inspection system of claim 5 wherein:

said track is adapted for placement on a surface over which a wheeled vehicle can be operated.

11. The fiber optic conduit under vehicle inspection system of claim 5 further including:

a plurality of track sections which are linked together.

12. The fiber optic conduit under vehicle inspection system of claim 5 wherein:

a plurality of fiber optic conduits are illuminated by the single light source.

13. An under vehicle inspection system comprising:

a plurality mats each having substantially the same size and shape defining a sheet of flexible material adapted for easy manual manipulation;

each said mat having substantially the same first width and first length adapted to be linked to at least one other of said plurality of mats;

a section of track having a longitudinal channel and substantially of said first length affixed to each of said plurality of mats;

said plurality of mats linked together with said sections of track aligned in tandem register in two substantially parallel rows;

at least one fiber optic conduit of continuous predetermined length greater than said first length received in said longitudinal channel of each said two substantially parallel rows of track.

14. A under vehicle inspection system comprising:

at least one length of polymeric optical fiber adapted to be connected to a light source;

at least one section of a track extending a predetermined distance and having therein a channel sized and adapted to retain a portion of the polymeric optical fiber;

the polymeric optical fiber having a series of notches cut therein for a first predetermined distance along its length and, reflector adjacent the notches and extending radially about the fiber optic in an arc of about 300 degrees;

a translucent or transparent jacketing material surrounding the clad core and the reflector; and a second predetermined length of said polymeric optical fiber surrounded by an opaque jacketing material.

* * * * *